(12) United States Patent
Hill et al.

(10) Patent No.: US 11,851,373 B1
(45) Date of Patent: Dec. 26, 2023

(54) COMPOSITIONS

(71) Applicant: Westlake Royal Roofing LLC, Houston, TX (US)

(72) Inventors: Russell L. Hill, San Antonio, TX (US); Robert F. Rathbone, San Antonio, TX (US); Amitabha Kumar, San Antonio, TX (US); Darren Schulz, San Juan Capistrano, CA (US); Eric Miller, El Dorado Hills, CA (US); James Hill, Clovis, CA (US); Hamed Maraghechi, San Antonio, TX (US); Jacob Myers, Corona, CA (US)

(73) Assignee: WESTLAKE ROYAL ROOFING LLC, Houston, TX (US)

( * ) Notice: Subject to any disclaimer, the term of this patent is extended or adjusted under 35 U.S.C. 154(b) by 935 days.

(21) Appl. No.: 16/722,258

(22) Filed: Dec. 20, 2019

Related U.S. Application Data (60) Provisional application No. 62/783,805, filed on Dec. 21, 2018.

(51) Int. Cl.
| | |
|---|---|
| *C04B 28/02* | (2006.01) |
| *E04D 1/16* | (2006.01) |
| *C04B 20/00* | (2006.01) |
| *C04B 111/10* | (2006.01) |
| *C04B 14/04* | (2006.01) |
| *C04B 111/00* | (2006.01) |
| *C04B 14/26* | (2006.01) |
| *C04B 14/10* | (2006.01) |
| *C04B 111/28* | (2006.01) |

(52) U.S. Cl.
CPC .......... *C04B 28/02* (2013.01); *C04B 20/0016* (2013.01); *E04D 1/16* (2013.01); *C04B 14/043* (2013.01); *C04B 14/10* (2013.01); *C04B 14/26* (2013.01); *C04B 2111/00594* (2013.01); *C04B 2111/1056* (2013.01); *C04B 2111/28* (2013.01)

(58) Field of Classification Search
None
See application file for complete search history.

(56) References Cited

U.S. PATENT DOCUMENTS

| | | | |
|---|---|---|---|
| 5,603,758 | A | 2/1997 | Schreifels, Jr. et al. |
| D586,008 | S | 2/2009 | Vandewater, Jr. et al. |
| D613,428 | S | 4/2010 | Truss et al. |
| (Continued) | | | |

FOREIGN PATENT DOCUMENTS

| | | |
|---|---|---|
| WO | WO 00/21901 | 4/2000 |

OTHER PUBLICATIONS

Eagle Roofing Products, Safety Data Sheet for "Eagle Roofing Products Concrete Roof Tile," Jun. 8, 2015 (12 pages).

(Continued)

*Primary Examiner* — Jeffrey D Washville
(74) *Attorney, Agent, or Firm* — Bookoff McAndrews, PLLC (57) ABSTRACT

Compositions such as concrete compositions are described for use in building materials and products. The composition may comprise an aggregate composition comprising a particulate suppressing component and a cement. The composition may have an impact resistance of at least Class 1 as measured under ANSI/FM 4473. Methods of preparing and using such compositions are also described.

21 Claims, 4 Drawing Sheets

(56) References Cited

U.S. PATENT DOCUMENTS

| | | |
|---|---|---|
| 8,157,009 B2 | 4/2012 | Patil et al. |
| 9,028,606 B2 | 5/2015 | Andersen et al. |
| 9,416,540 B2 | 8/2016 | Allen et al. |
| 2013/0139727 A1* | 6/2013 | Constantz ............... C04B 11/00 106/656 |

OTHER PUBLICATIONS

Beaudry, C. et al., "Construction Workers' Exposure to Crystalline Silica: Literature Review and Analysis," Studies and Research Products, Report R-771, IRSST, Mar. 2013 (108 pages).

Mitani, H et al., "Partial Replacement of Silica Sand by Crushed Limestone," 11th International Conference on Non-conventional Materials and Technologies, Bath, UK, Sep. 6-9, 2009, pp. 1-8.

* cited by examiner

COMPOSITIONS

CROSS REFERENCE TO RELATED APPLICATIONS

This application claims priority to U.S. Provisional Application No. 62/783,805 filed on Dec. 21, 2018, which is incorporated by reference herein in its entirety.

TECHNICAL FIELD

The present disclosure generally relates to compositions that provide for reduced exposure to respirable crystalline silica, e.g., reduced release of silica particulate matter. The compositions may comprise concrete useful for tiles and other building materials and products.

BACKGROUND

The OSHA standards are defined in 29 CFR 1910.1053 for general industry and maritime, and 29 CFR 1926.1153 for construction. Under these standards, employers must ensure that exposures to respirable crystalline silica do not exceed the Permissible Exposure Limits (PEL) of 50 µg/m$^3$ as an 8-hour time weighted average. Thus, exposures can fluctuate over the course of any 8-hour work shift, but the average exposure to respirable crystalline silica cannot exceed 50 µg/m$^3$. The action level standard is 25 µg/m$^3$. That is, exposures greater than 25 µg/m$^3$ over the course of an 8-hour time weighted average require employers to take measures to reduce the exposure and retest within certain time to ensure that the silica exposure is below the action level.

SUMMARY

The present disclosure includes a concrete composition comprising an aggregate composition comprising a particulate suppressing component, and a cement, e.g., a hydraulic cement; wherein dry machining of the concrete composition results in exposures under a Permissible Exposure Limit (PEL) of 50 micrograms of respirable crystalline silica per cubic meter of air (50 µg/m$^3$) as an 8-hour time-weighted average as defined by 29 CFR 1926.1153; and wherein the composition has an impact resistance of at least Class 3 as measured under ANSI/FM 4473. The particulate suppressing component may comprise, for example, an aggregate comprising granite, gneiss, basalt, or a material that has a Mohs hardness less than 6; an organic compound or admixture; a fiber material; or a combination thereof. Additionally, the present disclosure includes a concrete composition comprising an aggregate composition comprising an aggregate having a $d_{90}$ particle size less than or equal to 4 mesh and/or greater than or equal to 7 mesh, the aggregate comprising granite, gneiss, basalt, or a material that has a Mohs hardness less than 6; and a cement, e.g., a hydraulic cement; wherein the sample has an impact resistance of at least Class 3 as measured under ANSI/FM 4473.

According to some aspects of the present disclosure, the material that has a Mohs hardness less than 6 comprises calcium carbonate, limestone, dolomite, clay, wollastonite, or a combination thereof. Further, for example, the aggregate of such compositions may have a $d_{10}$ particle size less than or equal to 70 mesh and/or greater than or equal to 200 mesh; and/or an average particle size ($d_{50}$) of 0.1 mm to 5 mm. Additionally or alternatively, the aggregate may have a roundness shape factor less than 0.8 and/or a sphericity shape factor less than 0.8. The aggregate composition may be present in an amount of 35% to 90% by weight, with respect to the total weight of the concrete composition.

In some examples, the concrete composition comprises less than 25% by weight silica, such as less than 15% by weight silica, less than 10% by weight silica, less than 5% by weight silica, less than 1% by weight silica, or less than 0.1% by weight silica, with respect to the total weight of the concrete composition. In at least one example, the aggregate composition is substantially devoid of silica, e.g., devoid of siliceous sand. The concrete composition may have at least a Class C fire rating as measured under ASTM E 108.

The concrete compositions described above and/or elsewhere herein may be in the form of a roof tile. For example, the present disclosure includes a roof tile comprising an aggregate composition, and a cement; wherein the roof tile comprises less than 25% silica, and wherein dry machining of the roof tile results in exposures under a Permissible Exposure Limit (PEL) of 50 micrograms of respirable crystalline silica per cubic meter of air (50 µg/m$^3$) as an 8-hour time-weighted average as defined by 29 CFR 1926.1153; and wherein the roof tile has an impact resistance of at least Class 1 as measured under ANSI/FM 4473.

In some examples, the roof tile may have an average thickness of 1 inch to 30 inches and/or an average weight of 5 pounds to 15 pounds. Further, for example, the weight ratio of aggregate composition to cement may be 2 to 5. In some examples, the roof tile has a transverse break strength of 100 pounds force to 400 pounds force. According to some aspects of the present disclosure, the roof tile may have an average porosity greater than the average porosity of a reference roof tile that comprises more than 25% silica, and/or may generate an amount of dust during dry machining less than the amount of dust generated during dry machining of reference roof tile comprising silica. In at least one example, the amount of dust generated by the roof tile may comprise less than 20% insoluble material as measured under ASTM D3042-17.

In some examples, the aggregate composition of the roof tile may have a $d_{90}$ particle size less than 4 mesh and/or may comprise calcium carbonate, limestone, dolomite, clay, wollastonite, or a combination thereof. In some examples, the density of the roof tile may be less than 2.7 g/cm$^3$.

An exemplary method of installing the roof tiles contemplated herein includes dry cutting the roof tile and mounting the roof tile to a support.

The present disclosure also includes a tile system, which may comprise one or more of the concrete compositions described above and/or elsewhere herein. For example, the tile system may comprise at least one first tile comprising siliceous sand and a hydraulic cement; and at least one second tile comprising (i) a polymer composite or (ii) the concrete composition of any of claims 1-12; wherein the first tile and the second tile include complementary features; and wherein each of the first tile and the second tile has an impact resistance of at least Class 3 as measured under ANSI/FM 4473. In some examples, an upper surface of each of the first tile and the second tile includes a plurality of channels. Additionally or alternatively, a lower surface of the second tile, opposite the upper surface of the second tile, includes a plurality of ribs.

The present disclosure also includes aggregates useful for concrete compositions, e.g., roof tiles and other building materials, and/or tile systems. For example, the aggregate may have a $d_{90}$ particle size less than or equal to 4 mesh and/or greater than or equal to 7 mesh, the aggregate (i) being formed of granite, gneiss, basalt, or a material that has a Mohs hardness less than 6, (ii) having a roundness shape factor less than 0.8, and/or (iii) having a sphericity shape factor less than 0.8. According to some aspects, the aggregate comprises calcium carbonate, limestone, dolomite, clay, wollastonite, or a combination thereof.

Further, the present disclosure includes methods of preparing concrete compositions. In at least one example, the method comprises combining a particulate suppressing component with a hydraulic cement and water to form a mixture, wherein the particulate suppressing component comprises (i) the aggregate of claim 18 or 19; (ii) an organic compound or admixture, a fiber material, or a combination thereof; or (iii) both; and curing the mixture to form the concrete composition. The aggregate may have a $d_{90}$ particle size less than or equal to 4 mesh and/or greater than or equal to 7 mesh. In some examples, the mixture comprises a polymer and the aggregate, the polymer at least partially binding the aggregate, the hydraulic cement, or both. The organic compound or admixture may comprise, for example, latex, a fatty acid such as lauric acid, palmitic acid, stearic acid, or oleic acid, or a mixture thereof. The concrete composition prepared according to such methods may be a roof tile having an impact resistance of at least Class 3 as measured under ANSI/FM 4473.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

The singular forms "a," "an," and "the" include plural reference unless the context dictates otherwise. The terms "approximately" and "about" refer to being nearly the same as a referenced number or value. As used herein, the terms "approximately" and "about" generally should be understood to encompass ±5% of a specified amount or value. All ranges are understood to include endpoints, e.g., a particle size of 0.1 mm to 5 mm (or between 0.1 mm and 5 mm) includes particle sizes of 0.1 mm, 5 mm, and all values between.

The compositions herein may comprise an aggregate composition and a hydraulic cement. For example, the composition may be a concrete composition. The aggregate composition may comprise a particulate suppressing component, e.g., that reduces or otherwise controls the amount of particulate matter released upon manipulating (e.g., cutting, machining, breaking, installing, manufacturing, processing, etc.) the compositions. The particulate suppressing component may comprise, for example, an aggregate, an organic compound or admixture, a fiber material (inorganic and/or organic fibers), or a combination thereof.

In some examples, the aggregate composition may comprise an aggregate, optionally in combination with an organic compound or admixture and/or a fiber material. The aggregate may comprise one or more materials, such as, e.g., granite, gneiss, basalt, and/or a material that has a Mohs hardness less than 6. Examples of materials that have a Mohs hardness less than 6 suitable for the compositions herein include, but are not limited to, calcium carbonate, limestone, dolomite, clay, wollastonite, and combinations thereof. For example, the aggregate may comprise, consist of, or consist essentially of, one or more of granite, gneiss, basalt, calcium carbonate, limestone, dolomite, clay, or wollastonite.

In some examples, the aggregate comprises less than or equal to 5% by weight, or less than or equal to 1% by weight silica, e.g., 0.1% to 5% by weight silica (e.g., siliceous sand), with respect to the total weight of the aggregate. In some cases, the aggregate is substantially devoid of silica, that is, the aggregate comprises less than or equal to 0.1% by weight silica, with respect to the total weight of the aggregate.

The aggregate may have a desired particle shape and/or particle size distribution. The particle size distribution of the aggregate may be measured, for example, by sieving according to standard ASTM C136/C136M-14—Standard Test Method for Sieve Analysis of Fine and Coarse Aggregates. Such measurements may be expressed as a cumulative percentage by weight of particles having a size less than the given value. For example, the average particle size ($d_{50}$) refers to the value at which 50% by weight of the particles have a diameter less than that $d_{50}$ value (50% by weight of the particles are retained on sieves with openings of the given size and larger sizes). Similarly, the $d_{90}$ particle size (also referred to as the top particle size or top cut) refers to the value at which 90% by weight of the particles have a diameter less than that $d_{90}$ value (10% by weight of the particles are retained on sieves with openings of the given size and larger sizes).

According to some aspects of the present disclosure, the aggregate may have an average particle size ($d_{50}$) of 0.1 mm to 10 mm, such as 0.1 mm to 5 mm, 0.2 mm to 1.2 mm, 0.3 mm to 1.2 mm, 0.5 mm to 5 mm, 0.6 mm to 1.2 mm, 0.1 mm to 0.7 mm, or 1 mm to 3 mm. For example, the aggregate may have a $d_{50}$ particle size less than or equal to 16 mesh (1.19 mm) and/or greater than or equal to 50 mesh (0.30 mm), or less than or equal to 16 mesh (1.19 mm) and/or greater than or equal to 30 mesh (0.60 mm). Further, for example, the aggregate may have a $d_{90}$ particle size less than or equal to 5 mm, 4 mm, or 4.5 mm and/or greater than or equal to 1 mm, 2 mm, or 2.5 mm. For example, the aggregate may have a $d_{90}$ particle size less than or equal to 4 mesh (4.76 mm) and/or greater than or equal to 7 mesh (2.83 mm). Additionally or alternatively, the aggregate may have a $d_{10}$ particle size less than or equal to 0.2 mm, 0.15 mm, or 0.125 mm and/or greater than or equal to 0.05 mm, 0.075 mm, or 0.09 mm. For example, the aggregate may have a $d_{10}$ particle size less than or equal to 70 mesh (0.149 mm) and/or greater than or equal to 200 mesh (0.074 mm), or less than or equal to 100 mesh (0.149 mm) and/or greater than or equal to 270 mesh (0.053 mm).

Without wishing to be bound by theory, it is believed that the compositions and aggregates thereof herein (e.g., concrete compositions) unexpectedly generate less dust upon dry machining as compared to compositions of similar dimensions that comprise silica aggregate.

The aggregate may have a desired shape (e.g., angular, rounded), which may be characterized in roundness and/or sphericity shape factors using methods described by Krumbein and others (Krumbein, *J. Sediment Res.*, vol. 11, pp. 64-72, 1941; Krumbein et al., *Stratigraphy and Sedimentation,* 1951; Powers, *A New Roundness Scale for Sedimentary Particles,* 1953), wherein a perfectly spherical and well-rounded particle has a roundness shape factor of 1.0 and sphericity shape factor of 1.0. In some examples herein, the aggregate may have a roundness shape factor less than 0.8, such as 0.1 to 0.6 or 0.4 to 0.6, e.g., 0.1, 0.2, 0.3, 0.4, 0.5, or 0.6. Additionally, or alternatively, the aggregate may have a sphericity shape factor less than 0.8, such as 0.1 to 0.7 or 0.5 to 0.7, e.g., 0.1, 0.2, 0.3, 0.4, 0.5, 0.6, or 0.7. The aggregate may have a roundness shape factor and/or sphericity shape factor less than that of highly spherical and well-rounded siliceous sand (e.g., siliceous sand having a roundness=0.7-0.8 and sphericity=0.8).

According to some aspects of the present disclosure, the particles of aggregate may be increasingly angular as the particle size decreases. Alternatively, the particles may be more rounded as the particle size decreases. The sizes and shapes of aggregate particles of a concrete composition, such as a roof tile, may be determined by cutting and polishing a sample of the composition (e.g., a section of roof tile), and evaluating particle shape as a function of size upon examining the visible contours of the particles. Thus, for example, a chord length (e.g., rather than particle diameter) may be determined. Roundedness of the particles may be detected as the particle size changes, e.g., particles get coarse or finer.

The amount of aggregate may be greater than or equal to 25% by weight, with respect to the total weight of the aggregate composition, such as greater than or equal to 50% by weight, greater than or equal to 70% by weight, greater than or equal to 85% by weight, or greater than or equal to 95% by weight. For example, the aggregate may be present in an amount of 25% to 100% by weight, 50% to 99% by weight, 65% to 98% by weight, or 75% to 90% by weight, with respect to the total weight of the aggregate composition. Further, for example, the organic compound or admixture may be present in an amount of less than or equal to 30% by weight, with respect to the total weight of the aggregate composition. For example, the organic compound or admixture may be present in an amount of 0.05% to 30% by weight, 0.1% to 25% by weight, 1% to 10% by weight, 1% to 5% by weight, 3% to 10% by weight, or 5% to 15% by weight, with respect to the total weight of the aggregate composition. Exemplary organic compounds and admixtures include, but are not limited to, polymers and copolymers (e.g., latex, rubber, etc.), oils (e.g., coconut oil), fatty acids (e.g., lauric acid, palmitic acid, stearic acid, or oleic acid), and mixtures thereof. In at least one example, the aggregate composition does not include an organic compound or admixture. The fiber material may be present in an amount less than or equal to 15% by weight, with respect to the total weight of the aggregate composition, such as 0.05% to 15% by weight, 0.1% to 10% by weight, 0.5% to 5% by weight, or 1% to 3% by weight. Exemplary fiber materials include, but are not limited to, polymeric fibers and glass fibers.

In some examples, the aggregate composition comprises less than or equal to 25% by weight silica, with respect to the total weight of the aggregate composition, such as less than or equal to 20% by weight, less than or equal to 15% by weight, less than or equal to 10% by weight, less than or equal to 5% by weight, or less than or equal to 1% by weight. For example, the aggregate composition may comprise 0.5% to 15% by weight, 0.5% to 5% by weight, 7.5% to 15% by weight, or 10% to 20% by weight silica, with respect to the total weight of the aggregate composition. The silica may be in the form of siliceous sand, e.g., silica sand. In at least one example, the aggregate composition is substantially devoid of silica, that is, the aggregate composition comprises less than or equal to 0.1% by weight silica, with respect to the total weight of the aggregate composition.

Hydraulic cement refers to a material that, when combined with water, sets and hardens into cement. The hydraulic cement may be a rapid setting hydraulic cement, such that the cement sets within 60 minutes or less, 30 minutes or less, or 15 minutes or less. Exemplary hydraulic cements useful for the compositions herein include, but are not limited to, ordinary Portland cement, calcium aluminate cement, calcium phosphate cement, calcium sulfate hydrate cement, calcium aluminate sulfonate cement, magnesium oxychloride cement, magnesium oxysulfate cement, magnesium phosphate cement, a pozzolan material such as fly ash, or a combination thereof.

The compositions herein may comprise one or more additives, such as foaming aids, surfactants, blowing agents, fire retardants, pigments, and/or UV stabilizers. Generally, the amount of such additives is less than or equal to 5% by weight, with respect to the total weight of the composition. For example, the composition may comprise one or more additives, wherein the total amount of additive(s) is 0.01% to 5% by weight, 0.1% to 3% by weight, 0.5% to 1% by weight, or 3% to 5% by weight, with respect to the total weight of the composition. Without intending to be bound by theory, it is believed that modifying the concrete paste microstructure and/or density with additives such as blowing agents or foaming agents may result in a structure that fractures differently during processing (e.g., sawing/cutting) and less production of respirable crystalline silica.

According to some aspects of the present disclosure, the aggregate composition may be present in an amount of 20% to 90% by weight, with respect to the total weight of the concrete composition, such as 25% to 90% by weight, 30% to 90% by weight, 35% to 90% by weight, 25% to 85% by weight, 30% to 75% by weight, 60% to 90% by weight, 55% to 80% by weight, 35% to 50% by weight, or 45% to 70% by weight. Further, for example, the cement may be present in the composition in an amount of 5% to 65% by weight, with respect to the total weight of the composition, such as 10% to 65% by weight, 15% to 50% by weight, 10% to 30% by weight, 20% to 55% by weight, 35% to 60% by weight, or 40% to 65% by weight.

The compositions herein may be prepared by combining an aggregate composition (or particle suppressing component) as described herein with a cement, e.g., a hydraulic cement, and water to form a mixture, and curing the mixture to form a concrete composition. For example, the particulate suppressing component may comprise an aggregate, an organic compound or admixture, a fiber material, or a combination thereof. The components may be added together in any sequence or simultaneously. For example, an aggregate may be combined with a cement, e.g., hydraulic cement, and optionally a fiber material and/or organic compound or admixture, and then water added to hydrate the resulting mixture to begin the curing process. In another example, an aggregate first may be combined with an organic compound or admixture (e.g., the organic material (s) at least partially coating the aggregate), followed by addition of a cement, e.g., hydraulic cement, and then water. The organic compound or admixture may be added in particulate form or liquid form. The weight ratio of the aggregate composition to the cement may range from 2 to 5, such as from 3 to 4.

Without intending to be bound by theory, it is believed that incorporating a fiber material and/or organic compound or admixture may help to bind the composition together. This binding, in turn, may inhibit fracturing of the composition into fine particulate dust upon handling or processing the composition. Binding may occur during and/or after manufacturing. For example, a semi-solid organic compound (e.g., a polymer such as latex or rubber) may be incorporated into the composition in particulate form to act as binder when the composition is processed (e.g., penetrated by a saw blade or contacted by a grinder). The organic material may effectively partially melt and "smear" to bind other components of the composition and reduce the release of particulate matter, including respirable crystalline silica. Similarly, a fiber material and/or organic compound may bind with the aggregate to result in larger-sized particles less prone to become airborne than smaller-sized particles.

The compositions herein may provide for reduced respirable crystalline silica when manipulated or otherwise processed, e.g., by machining. As used herein, dry machining refers to any type of machine cutting process (including sawing, cutting, turning, grinding, boring, drilling, planing, shaping, reaming, tapping, broaching, etc.), other than chiseling and chipping, the process being performed under dry conditions. For example, dry machining does not include the continuous addition of a liquid proximate the cut, e.g., as in the case of a wet cutting saw. An example of a saw used for dry machining of tiles is a concrete saw equipped with a diamond saw blade having a blade thickness of about 0.135 inch.

In at least one example, dry machining of the concrete composition results in exposures under a Permissible Exposure Limit (PEL) of 50 micrograms of respirable crystalline silica per cubic meter of air (50 $\mu g/m^3$) as an 8-hour time-weighted average as defined by 29 CFR 1926.1153. In at least one example, dry machining of the concrete composition results in an action level less than or equal to 25 micrograms of respirable crystalline silica per cubic meter of air (25 $\mu g/m^3$) as an 8-hour time-weighted average, as defined by 29 CFR 1926.1153. The compositions herein also may comply with the applicable OSHA regulations when manipulated by equipment (saws, grinders, etc.) designed to minimize respirable crystalline silica with dust collection devices, vacuum dust traps, baghouses, fluid, etc. For example, certain machining features such as the type of saw, blade design, frequency of teeth, kerf, speed (revolutions per minute), and the like, may be selected to further reduce the amount of dust released.

The porosity of the compositions herein may be engineered by controlling chemical and processing parameters to produce desired dust control properties. According to some aspects of the present disclosure, the average porosity of the composition (e.g., roof tile) may be greater than the average porosity of a reference composition (e.g., reference roof tile or second roof tile) comprising an aggregate composition that includes siliceous sand and more than 25% silica. For example, a reference/second roof tile comprising a cement and an aggregate composition that includes siliceous sand may have a lower average porosity than a roof tile according to the present disclosure that has the same dimensions and comprises the same cement but in combination with an aggregate composition devoid of siliceous sand. Porosity may be measured as described in ASTM C642, or by image analysis performed on cross-sectional images obtained by a stereoscope and analyzed by commercially available software.

The compositions herein may be formed into any desired building materials or products, including, but not limited to, tiles (roof tiles, floor tiles, bathroom tiles, kitchen tiles, pool tiles, siding tiles, etc.), countertops, driveways, sidewalks, bricks, masonry blocks, stones, cladding, and other materials and products. An exemplary method for installing a composition, according to some aspects of the present disclosure, includes dry cutting the composition, wherein dry cutting the composition results in less than or equal to an action level of 25 micrograms of respirable crystalline silica per cubic meter of air (25 $\mu g/m^3$) as an 8-hour time-weighted average, as defined by 29 CFR 1926.1153, and mounting the composition to a support. The dry cutting may be performed before or after mounting the composition to the support. When the composition is a roof tile, for example, the support may be sheathing, a batten, or other material on the roof of a building suitable for securing tiles thereto. For example, the support may comprise wood, plastic, or metal.

The compositions herein can be prepared with any desired dimensions or shapes. According to some aspects of the present disclosure, the composition has a rectangular shape (e.g., useful as a roof tile) having a length, a width, and a thickness. For example, the composition may have a length (measured along the x-axis) of greater than or equal to 2 feet, a width (measured along the y-axis) greater than or equal to 10 inches, and a thickness (measured along the z-axis) of 1 inch to 30 inches. Further, for example, the composition may have a length of 2 feet to 15 feet, such as 4 feet to 8 feet; a width of 4 inches to 2 feet, such as 10 inches to 1 foot; and a thickness of 0.1 inches to 6 inches, such as 0.2 inches to 0.4 inches. According to some examples herein, the average thickness of the composition ranges from 1 inch to 30 inches, for example from 1 inch to 25 inches, 1 inch to 20 inches, 1 inch to 15 inches, 1 inch to 10 inches, 10 inches to 30 inches, 15 inches to 30 inches, or 20 inches to 30 inches.

According to some examples herein, the composition may have a weight ranging from 1 pound to 20 pounds, for example 1 pound to 15 pounds, 2 pounds to 15 pounds, 3 pounds to 15 pounds, 4 pounds to 15 pounds, or 5 pounds to 15 pounds. In some embodiments, the composition may have an average density equal to or less than 2.7 $g/cm^3$, such as 1 $g/cm^3$ to 2.7 $g/cm^3$ or 1.5 $g/cm^3$ to 2.7 $g/cm^3$.

The compositions herein may have sufficient mechanical strength and/or other properties for the intended use. For example, the compositions (e.g., roof tiles) herein may have a transverse break strength ranging from 100 pounds force to 400 pounds force, such as from 150 pounds force to 250 pounds force. Transverse break strength can be measured as described in ASTM C1492 or UBC Standard 15-5. Further, the compositions herein may meet certain applicable building codes and standards. For example, the composition may have an impact resistance of at least Class 1, at least Class 2, at least Class 3, or at least Class 4, as measured under ANSI/FM 4473. Such compositions may include, for example, tiles such as roof tiles. Further, the compositions herein may have desired fire ratings, e.g., a fire rating of at least Class C, at least Class B, or at least Class A, as measured under ASTM E 108.

The compositions herein may be part of a tile system comprising at least two different types of tiles. For example, the system may include a first tile that comprises siliceous sand and a hydraulic cement and a second tile comprising a concrete composition as disclosed herein (e.g., the concrete composition comprising an aggregate composition and a hydraulic cement) or a polymer composite. The first and second tiles of such systems may have the same or similar impact resistance and/or fire rating properties. For example, the first and second tiles each may have an impact resistance of at least Class 1, at least Class 2, at least Class 3, or at least Class 4, as measured under ANSI/FM 4473. Additionally, the first and second tiles may have the same or similar structural or design features, such that one or more surfaces of the first and second tiles appear similar or substantially the same.

Figure 1:
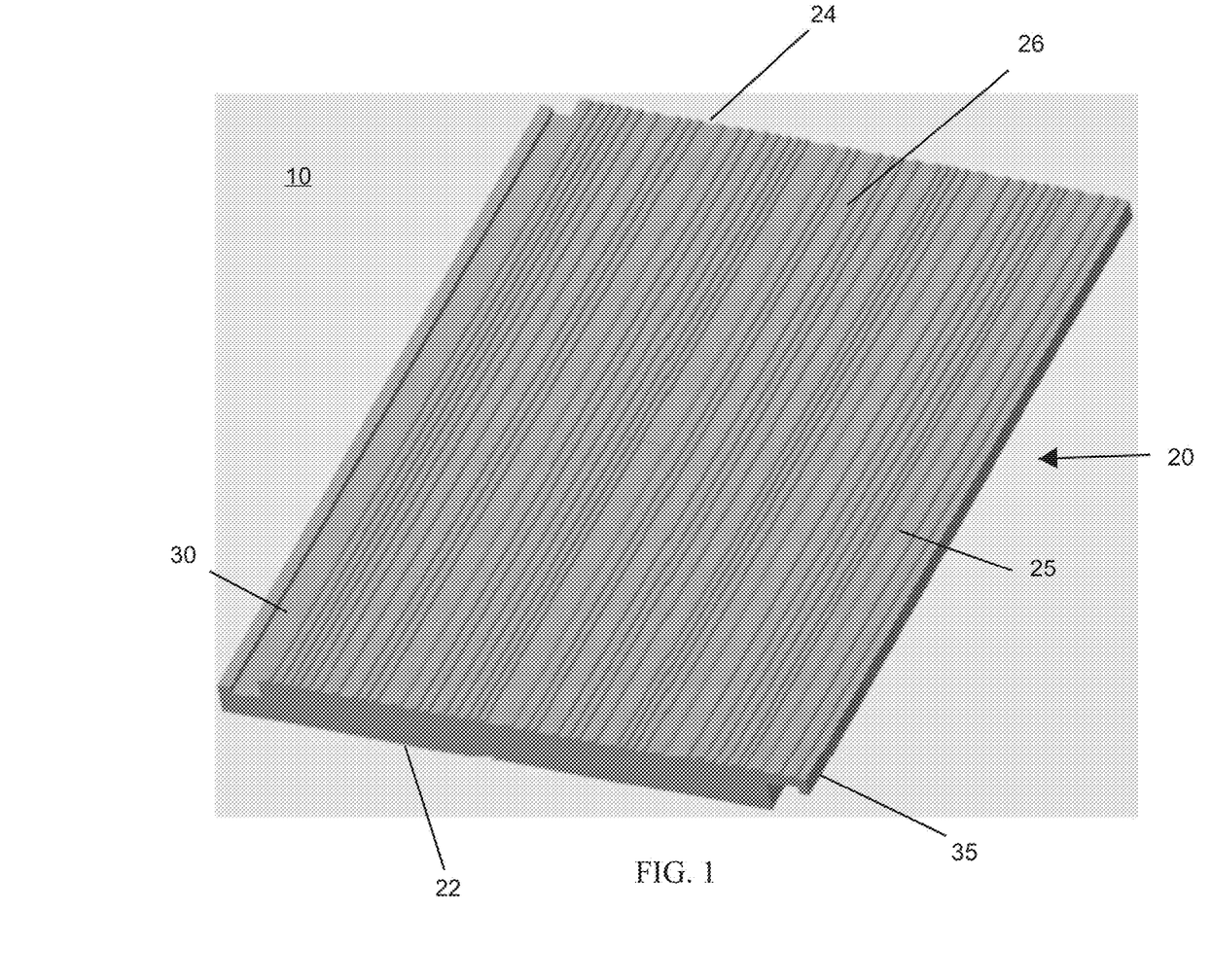
FIGS. 1 and 2 show top and bottom views, respectively, of an exemplary tile according to some aspects of the present disclosure.
Figure 2:
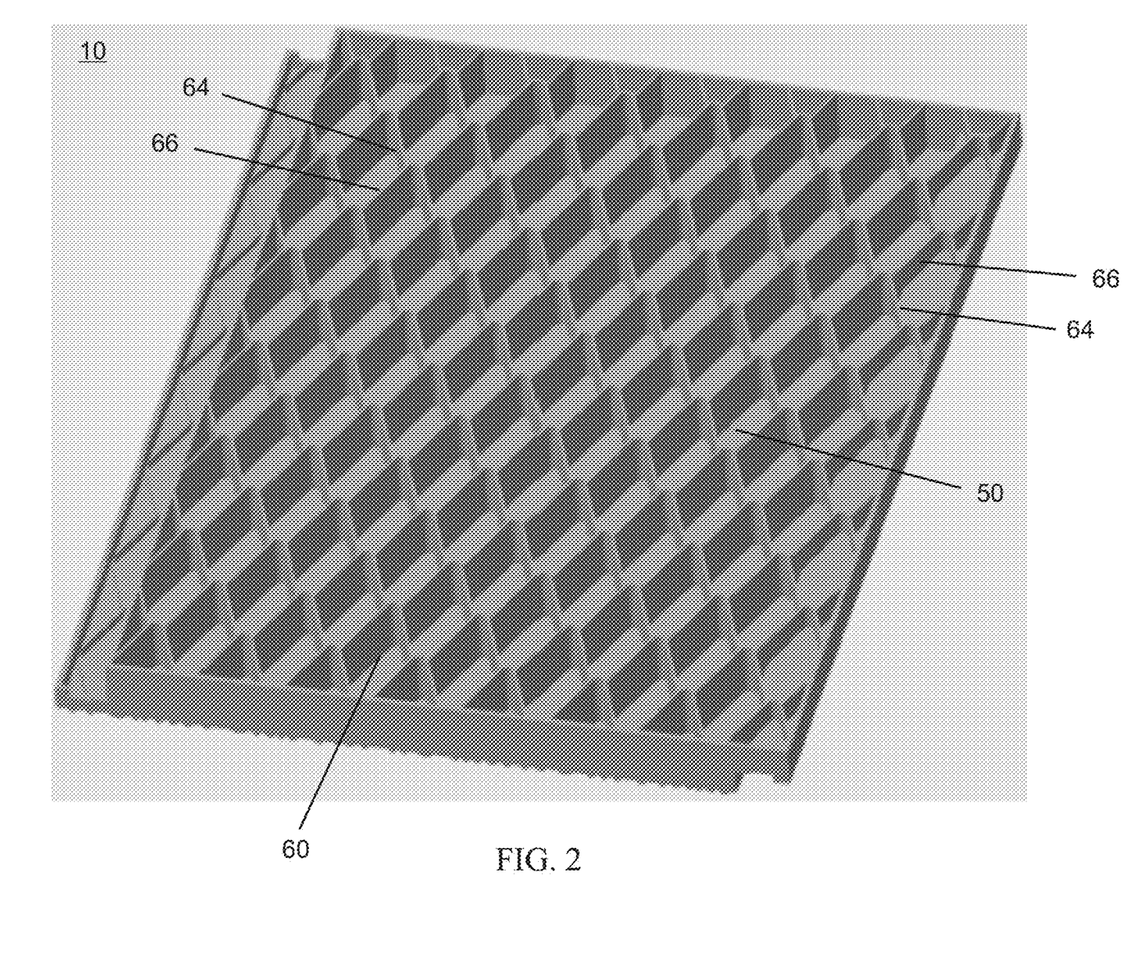

FIGS. 1 and 2 show an exemplary roof tile 10 that can be used in combination with concrete or clay tiles, including concrete or clay tiles that comprise siliceous sand. The system can comprise composite tiles with concrete and/or clay tiles. The roof tile 10 can be used where the tiles need to be cut and the concrete or clay tiles can be used where no cuts are necessary.

The roof tile 10 can include water management features to help prevent water from getting behind an installed roof tile 10. Water management features can include a side channel 30 and/or a top channel or other design features that can assist in moving water from the top of the roof tile 10 to the bottom of the roof tile 10 without getting behind the roof tile 10. Side channel 30 can also be used to reduce movement between adjacent roof tiles by interlocking side channel 30 with a corresponding side protrusion 35. The roof tile 10 can also include a coating. The coating can be a sealant, can increase the durability or strength of the tile, or can add color to the roof tile 10.

The roof tile 10 can have the same color as the concrete or clay tile used in combination with the roof tile 10. Further, roof tile 10 can wear to maintain the same look as the concrete or clay tiles. The roof tile 10 can have a similar rate of expansion/contraction as the concrete or clay tiles used in combination with the roof tile 10. The roof tile 10 can be easier to cut than the concrete or clay tile used in combination with the roof tile 10. The roof tile 10 can be cut using hand tools, such as a boxcutter and/or any of the machining equipment discussed above. Methods of cutting tiles as described herein using hand tools can improve safety, improve efficiency of installation of roof systems, and reduce dust generation. The roof tiles 10 can comprise 5%-20%, 5%-15%, or 9%-15% of the total pieces of tile used on a roof.

The body 20 can be movable between an uninstalled position and an installed position. Generally, in the uninstalled position, the roof tile 10 can have both transverse and longitudinal concavity-creating gaps or offsets from a mounting surface, such as a support (e.g., sheathing, battens, etc.). The body 20 can be capable of elastic deformation between the uninstalled position and the installed position. A forward edge 22 of the body 20 is on the downward side or lower portion of the roof tile 10, relative to the mounting surface. A rearward edge 24 is the upward side or higher portion of the roof tile 10, relative to the mounting surface. The rearward edge 24 may be chamfered toward the mounting surface.

As shown in FIG. 1, the body 20 can have a face side 25 opposite the mounting surface with a textured surface 26, e.g., a ribbed pattern, that can match the texture or ribbed pattern of a corresponding concrete or clay tile. Note that only one of the roof tiles 10 shown in FIG. 1 is illustrated with the ribbed pattern. In many configurations of the tile system, the roofing tiles 10 can have numerous different textures or patterns of the textured surface 26. It is possible for several, if not all, of the roof tiles 10 to have different aesthetic looks.

One or more fastener points can be marked on the roof tile 10, such as through indentations, molded features, or ink. The fastener points can help an installer identify locations through which the one or more fasteners should be driven into the mounting surface. The body 20 further can include or define a center mark at the rearward edge 24. The body 20 can also include or define one or more length marks, which may be used in conjunction with chalk lines on the mounting surface to vertically locate the roof tile 10 relative to other roof tiles 10.

During installation of the roof tile 10, the installer can place the roof tile 10 onto the mounting surface. At this point, the roof tile 10 is in the uninstalled position and both the longitudinal arch and the transverse arch can be visible as camber away from the mounting surface. The installer can flex the body 20 against the mounting surface to remove the camber and drive the fastener through the body into the mounting surface. Alternatively, the installer can simply drive the fastener through the body 20 until the head of the fastener is flush with the body 20 and the body 20 is flush with the mounting surface.

The body 20 can have a forward thickness at the forward edge 22 and a rearward thickness at the rearward edge 24. The forward thickness can be greater than the rearward thickness, such that the roof tile 10 is sloped or wedge-shaped. However, the forward thickness and the rearward thickness can be substantially equal or may have varying degrees of front-to-back drop.

In the uninstalled position, the body 20 can have or define a first offset along the longitudinal length or vertical span of the roof tile 10. The first offset can create a gap or space between the body 20 and the mounting surface. In the uninstalled position, the body 20 can have or define a second offset along the transverse width or horizontal span of the roof tile 10. The second offset can create a gap or space between the body 20 and the mounting surface. Therefore, portions of an underside of the roof tile 10 are not in contact with the mounting surface while the roof tile 10 is in the uninstalled position. The underside is the opposing side of the body 20 from the face side 25. Fasteners can be driven through the body 20 at the fastener points to place the roof tile 10 into the installed position. The body 20 can be biased against the mounting surface by the fastener to substantially close the first offset. Furthermore, the second offset can also closed in the installed position.

Therefore, the body 20 can abut the mounting surface and the underside of the body 20 can be substantially planar, as opposed to the dual arches of the uninstalled position. The roof tile 10 can be sufficiently flexible to allow the fastener to bias the body 20 without fracturing any portions thereof. However, the roof tile 10 may be sufficiently rigid to retain some resistance to force applied to the body 20 and feel more like actual concrete or clay tile.

The uninstalled position can actually be further divided into an as-molded shape and a sagging shape. Molds used to form the roof tile 10 can define both longitudinal and transverse arches into the body 20. For example, the as-molded shape of the roof tile 10 may include arches defining the first offset of up to approximately 0.375 inches and the second offset of up to approximately 0.125 inches.

However, when the roof tile 10 is removed from the mold, the weight of the body 20 can cause sagging by varying amounts, depending on: the materials used to form the roof tile 10, the sizes of the first offset and the second offset, the longitudinal and transverse spans of the body 20, and any deformation resulting from storage or transport of manufactured roof tiles 10. The sagging shape may also be referred to as a resting shape or relaxed shape.

In the sagging position, for example, the body 20 can deflect enough to substantially close the second offset, such that the transverse arch may not be viewable when the roof tile 10 is resting on the mounting surface or a planar surface.

However, the lack of arch can be a result of deformation away from the arch defining the second offset in the as-molded shape.

In the installed position, the fastener can be reacted by the body 20 at, or around, the fastener points. However, the reaction forces between the mounting surface and the body 20 can be substantially at the corners of the body 20. Therefore, the roof tile 10 having the as-molded dual arches can press its corners against the mounting surface. Contrarily, a tile that is molded completely flat would be pressing against the mounting surface at or around the fasteners. This may allow the corners of such a flat tile to curl away from the mounting surface slightly.

Wind shear may provide an upward force on the roof tile 10, such as at the forward edge 22. The upward force of wind creates a moment between the front edge 22 and the fastener. However, the roof tile 10 may counteract this moment as a result of biasing the body 20 to close the first offset. Contrarily, a flat tile would not have any counteract moment, and the front edge thereof may lift away from the mounting surface in heavy winds.

In some configurations of the roof tile 10, the body 20 may include a plurality of ribs 60, as best viewed in FIG. 2. The ribs 60 may reduce the overall weight of the roof tile 10, relative to a solid body, while maintaining engineered structural characteristics. The ribs 60 can define a portion of the underside 50, such that moving the roof tile 10 from the installed to the uninstalled position includes closing the gap between the ribs 60 and the mounting surface.

The roof tile 10 can include at least one longitudinal rib, or cutting rib. The longitudinal ribs can allow the roof tile 10 to be cut vertically during installation and then installed to the mounting surface without showing any of the gaps between the body 20 and the mounting surface. For example, when offsetting the second course of roof tiles 10, the installer may cut the first roof tile 10 in the second course in half by removing material to the left of the central longitudinal rib. However, without the longitudinal rib, caverns or gaps may be visible from the edge of the mounting surface (i.e., from the side of the roof).

The other longitudinal ribs (nearer the left and right edges) may also assist in installation by providing cut lines for the last roof tile 10 in the course. The longitudinal ribs can create both beginning and ending cut lines that allow the roof tiles 10 to be offset, and to be installed on different width roofs, without exposing visible gaps at the ends of the mounting surface. Note that the longitudinal ribs are flush with the mounting surface when the roof tile 10 is in the installed position. Additionally, the longitudinal ribs can extend from the front edge 22 toward the rear edge 24, and extend vertically at least as far as any of the other ribs 60.

The roof tile 10 includes a plurality of first-angle ribs 64, which are angled relative to the y-axis and to the x-axis, and also relative to the forward edge 22, as illustrated by a first offset angle. The roof tile 10 also includes a plurality of second-angle ribs 66, which are angled relative to the first-angle ribs 64, the y-axis, and the x-axis, as illustrated by a second offset angle. In the orientation of FIG. 2, the first-angle ribs 64 are generally angled from the upper left toward the lower right, and the second-angle ribs 66 generally angled from the upper right toward the lower left.

The first-angle ribs 64 and the second-angle ribs 66 can cooperate to form or define an elongated diamond pattern. However, unlike some diamond patterns, the intersections of which form a continuous and repeating "X," the first-angle ribs 64 and the second-angle ribs 66 do not have shared vertices in the example shown in FIG. 2. As used herein, a shared vertex refers to a single point at which two or more ribs intersect. For example, in the typical X-pattern, four ribs intersect at a shared vertex.

Furthermore, in the roof tile 10 shown, neither the first-angle ribs 64 nor the second-angle ribs 66 can align with each other to form continuous lines. Adjacent first-angle ribs 64 can be not collinear, such that there is an offset 69 between adjacent first-angle ribs 64. Similarly, adjacent second-angle ribs 66 can be not collinear and have an offset (unnumbered) there between. Therefore, there is a space of several elongated diamonds before any of the first-angle ribs 64 or the second-angle ribs 66 align.

As indicated by FIGS. 1 and 2, the ribs 60 can substantially contact the mounting surface when the roof tiles 10 are installed to the mounting surface, although some slight offsets may exist. Therefore, there are substantially no continuous channels or passageways through which gases or liquids could flow upward or downward between the body 20 and the mounting surface. The elongated diamond pattern formed by the first-angle ribs 64 and the second-angle ribs 66 can break up at least a portion or all such pathways.

The ribs 60 shown can provide improved strength characteristics in resisting wind loads. Furthermore, the ribs 60 may exhibit improved response to hail, or other storm impacts. The underside 50 of the body 20 may also include a reinforcement rib adjacent one or more of the fastener points. The reinforcement rib may help prevent the fastener from being over-driven, fracturing the roof tile 10, or both.

The roof tile 10 shown can be formed from injection molding as a single, continuous, and unitary component. For example, there may be no seams or portions of the roof tile 10 where two separately made components are later joined or fastened. Other molding or manufacturing processes may be used to form the roof tile 10.

The injection molding process can occur in a mold as polymeric or composite materials are injected into the mold at an offset injection point. A sprue injects the materials perpendicularly into what will become the face side 25 of the roof tile 10. The offset injection point can be above the fastener points, such that it is also above the overlap line for the subsequent course of roof tiles 10.

Furthermore, the offset injection point can also offset to either the left or the right of the center mark and the center line of the roof tile 10. Therefore, the offset injection point in such cases is not visible once subsequent courses of roof tiles 10 are installed, as the keyway formed between subsequent roof tiles 10 do not expose the offset injection point to view, which may be aesthetically displeasing.

The roof tile 10 also can include an injection area surrounding the offset injection point. The injection area can be textured, as opposed to smooth. This may be accomplished via post-injection processes, such as abrasion. Alternatively, the roof tile 10 may be formed in a mold with a textured injection nozzle, such that the texture is imparted during the injection molding process.

Figure 3:
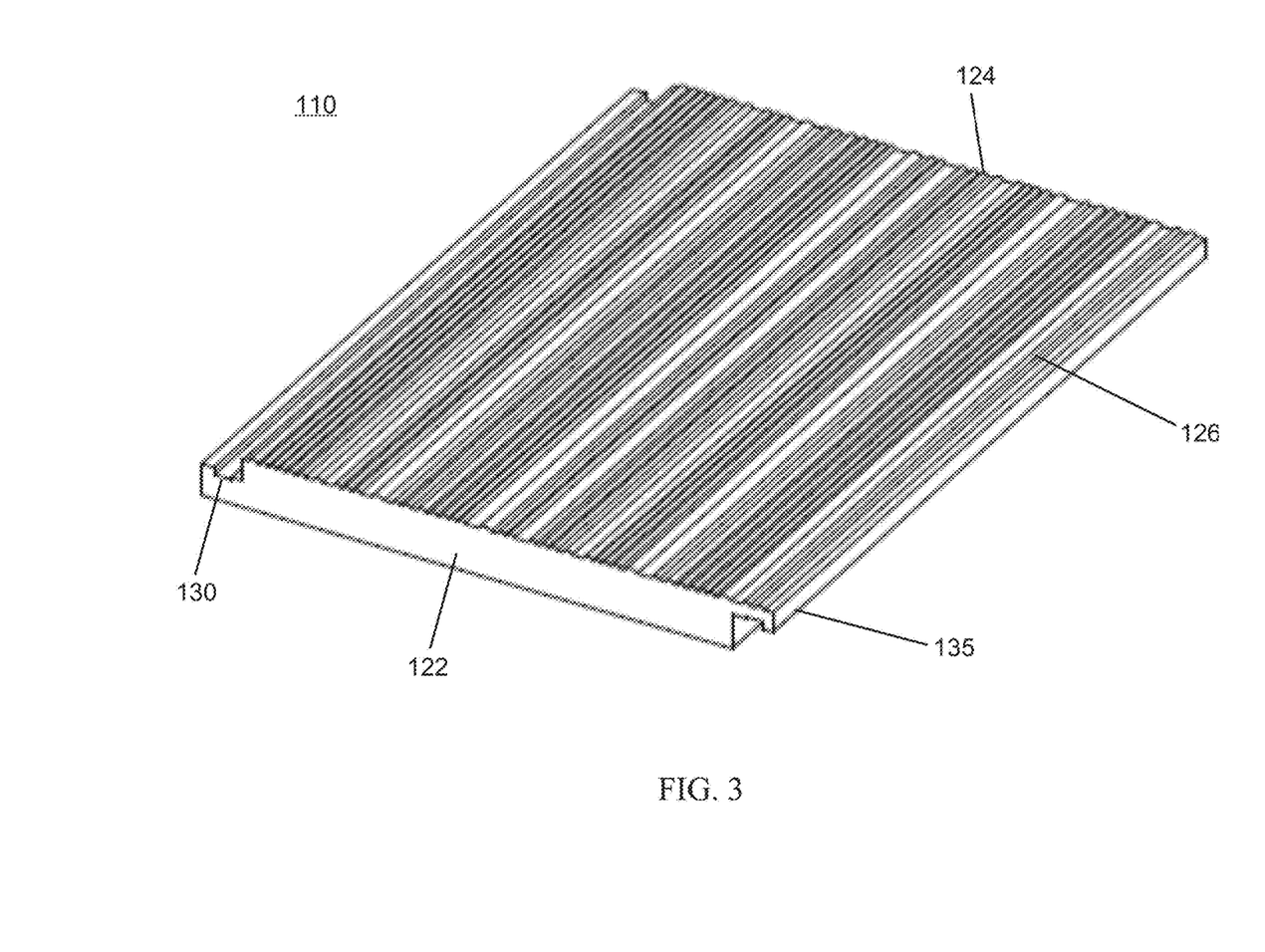
FIGS. 3 and 4 show top and bottom views, respectively, of another exemplary tile, according to some aspects of the present disclosure.
Figure 4:
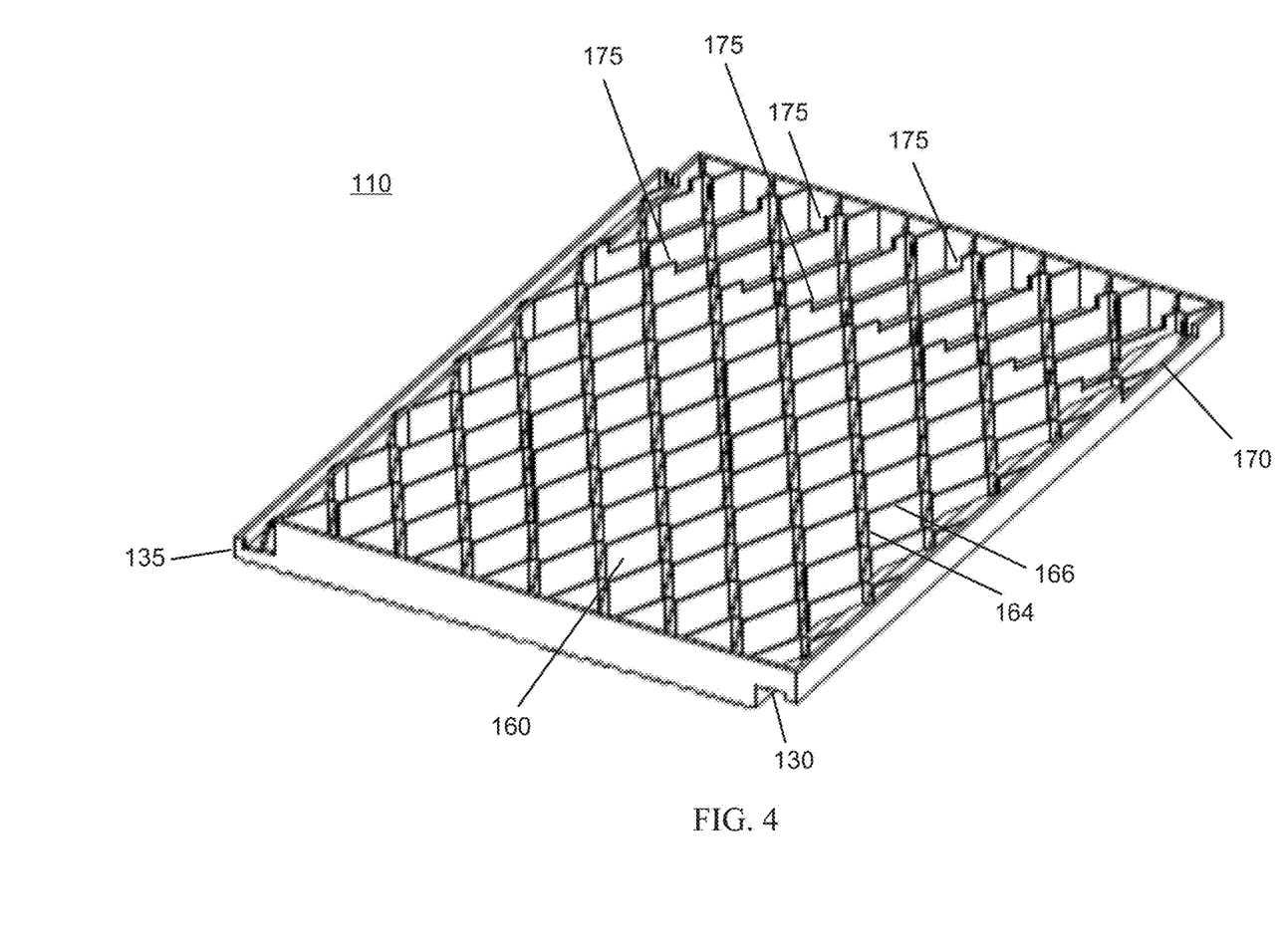

FIGS. 3 and 4 show another exemplary tile 110 of a tile system according to the present disclosure. The tile 110 may include any of the features of tile 10 discussed above. For example, FIG. 3 shows a face side of the tile 110 having a textured surface 126 with a ribbed pattern, and FIG. 4 shows the underside of the tile 110 having a plurality of ribs 160. Further referring to FIG. 3, the tile 110 has a forward edge 122, a rearward edge 124, a side channel 130, and a corresponding side protrusion 135. The plurality of ribs 160 of the underside of the tile 110 includes a plurality of first-angle ribs 164 and second-angle ribs 166, similar to tile 10. The underside of the tile 110 also includes a plurality of cut-outs 175 defining a notch 170 parallel to the forward edge 122 and rearward edge 124. The notch 170 may extend along at least a portion, or the entire, width of the tile 110. The notch 170 may be configured to facilitate placement of the tile 110 on a support structure, such as a roof batten.

An exemplary composite tile system of the present disclosure comprises a concrete or clay tile configured to be secured to a mounting surface, and a composite tile or concrete tile including the concrete composition described herein configured to be cut prior to being secured to the mounting surface. The composite tile of the composite tile system may further comprise a body, wherein the composite tile is configured to move between an uninstalled position and an installed position, such that, in the uninstalled position, the body defines a first offset along the longitudinal length between the body and the mounting surface and a second offset along the transverse width between the body and the mounting surface; and in the installed position, the body is biased against the mounting surface by a fastener to substantially close the first and second offsets, such that the body abuts the mounting surface and an underside of the body is substantially planar.

It is intended that the specification and figures be considered as exemplary only, with a true scope and spirit of the present disclosure being indicated by the following claims.

What is claimed is:

1. A concrete composition comprising:
    an aggregate composition comprising a particulate suppressing component, wherein the particulate suppressing component comprises an aggregate that has an average particle size ($d_{50}$) of 0.1 mm to 5 mm and a $d_{10}$ particle size greater than or equal to 200 mesh and less than or equal to 70 mesh; and
    a hydraulic cement;
        wherein dry machining of the concrete composition results in exposures under a Permissible Exposure Limit (PEL) of 50 micrograms of respirable crystalline silica per cubic meter of air (50 $\mu g/m^3$) as an 8-hour time-weighted average as defined by 29 CFR 1926.1153; and
        wherein the composition has an impact resistance of at least Class 3 as measured under ANSI/FM 4473.

2. The concrete composition of claim 1, wherein the aggregate comprises granite, gneiss, basalt, or a material that has a Mohs hardness less than 6; and wherein the particulate suppressing component further comprises an organic compound or admixture; a fiber material; or a combination thereof.

3. The concrete composition of claim 1, wherein the aggregate has a $d_{90}$ particle size less than or equal to 4 mesh, greater than or equal to 7 mesh, or less than or equal to 4 mesh and greater than or equal to 7 mesh.

4. The concrete composition of claim 2, wherein the material that has a Mohs hardness less than 6 comprises calcium carbonate, limestone, dolomite, clay, wollastonite, or a combination thereof.

5. The concrete composition of claim 2, wherein the particulate suppressing component comprises the organic compound or admixture, and the organic compound or admixture comprises latex, a fatty acid, or a mixture thereof.

6. The concrete composition of claim 5, wherein the particulate suppressing component further comprises the fiber material.

7. The concrete composition of claim 1, wherein the aggregate has a roundness shape factor less than 0.8, a sphericity shape factor less than 0.8, or a roundness shape factor less than 0.8 and a sphericity shape factor less than 0.8.

8. The concrete composition of claim 1, wherein the concrete composition comprises less than 25% by weight silica, less than 15% by weight silica, less than 10% by weight silica, less than 5% by weight silica, less than 1% by weight silica, or less than 0.1% by weight silica, with respect to the total weight of the concrete composition.

9. The concrete composition of claim 1, wherein the aggregate composition is substantially devoid of siliceous sand.

10. The concrete composition of claim 1, wherein the aggregate composition is present in an amount of 35% to 90% by weight, with respect to the total weight of the concrete composition.

11. The concrete composition of claim 1, wherein the concrete composition has at least a Class C fire rating as measured under ASTM E 108.

12. The concrete composition of claim 1, wherein the concrete composition is a roof tile.

13. A roof tile comprising:
    an aggregate composition comprising a particulate suppressing component, wherein the particulate suppressing component comprises an aggregate that has an average particle size ($d_{50}$) of 0.1 mm to 5 mm and a $d_{10}$ particle size greater than or equal to 200 mesh and less than or equal to 70 mesh; and
    a cement;
    wherein the roof tile comprises less than 25% siliceous sand;
    wherein dry machining of the roof tile results in exposures under a Permissible Exposure Limit (PEL) of 50 micrograms of respirable crystalline silica per cubic meter of air (50$\mu g/m^3$) as an 8-hour time-weighted average as defined by 29 CFR 1926.1153; and
    wherein the roof tile has an impact resistance of at least Class 1 as measured under ANSI/FM 4473.

14. The roof tile of claim 13, wherein an average thickness of the roof tile is 1 inch to 30 inches, an average weight of the roof tile is 5 pounds to 15 pounds, or wherein an average thickness of the roof tile is 1 inch to 30 inches and an average weight of the roof tile is 5 pounds to 15 pounds.

15. The roof tile of claim 13, wherein a weight ratio of the aggregate composition to the cement is 2 to 5.

16. The roof tile of claim 13, wherein a transverse break strength of the roof tile is 100 pounds force to 400 pounds force.

17. The roof tile of claim 13, wherein:
    (a) an average porosity of the roof tile is greater than an average porosity of a second roof tile comprising more than 25% silica; or
    (b) an amount of dust generated during dry machining of the roof tile is less than an amount of dust generated during dry machining of a second roof tile comprising more than 25% by weight silica;
        wherein the second roof tile comprises the cement and an aggregate composition that includes siliceous sand.

18. The roof tile of claim 17, wherein the amount of dust generated by the roof tile in (b) comprises less than 20% insoluble material as measured under ASTM D3042-17.

19. The roof tile of claim 13, wherein the aggregate composition has a $d_{90}$ particle size less than or equal to 4 mesh.

20. The roof tile of claim 13, wherein the aggregate composition comprises calcium carbonate, limestone, dolomite, clay, wollastonite, or a combination thereof.

21. A tile system, comprising:
- at least one first tile comprising siliceous sand and a hydraulic cement; and
- at least one second tile comprising (i) a polymer composite or (ii) the concrete composition of claim 1;
    - wherein the first tile and the second tile include complementary features; and
    - wherein each of the first tile and the second tile has an impact resistance of at least Class 3 as measured under ANSI/FM 4473.

* * * * *